United States Patent
Satou

(10) Patent No.: US 11,336,375 B2
(45) Date of Patent: May 17, 2022

(54) OPTICAL TRANSMISSION APPARATUS, OPTICAL COMMUNICATION SYSTEM, AND OPTICAL SIGNAL TRANSMISSION METHOD

(71) Applicant: NEC Corporation, Tokyo (JP)

(72) Inventor: Yoshirou Satou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/273,571

(22) PCT Filed: Apr. 25, 2019

(86) PCT No.: PCT/JP2019/017694
§ 371 (c)(1),
(2) Date: Mar. 4, 2021

(87) PCT Pub. No.: WO2020/049791
PCT Pub. Date: Mar. 12, 2020

(65) Prior Publication Data
US 2021/0320720 A1  Oct. 14, 2021

(30) Foreign Application Priority Data
Sep. 7, 2018 (JP) .............................. JP2018-168150

(51) Int. Cl.
*H04J 14/02* (2006.01)
*H04B 10/50* (2013.01)

(52) U.S. Cl.
CPC .............. *H04B 10/50* (2013.01); *H04J 14/02* (2013.01)

(58) Field of Classification Search
CPC .... H04J 14/02; H04J 14/0221; H04J 14/0204; H04J 14/0205; H04J 14/0206;
(Continued)

(56) References Cited

U.S. PATENT DOCUMENTS

2010/0290786 A1* 11/2010 Abbott ................ H04J 14/0205
398/79
2012/0195592 A1   8/2012 Barnard et al.
(Continued)

FOREIGN PATENT DOCUMENTS

| JP | 2012-527189 A | 11/2012 |
|---|---|---|
| JP | 2016-010040 A | 1/2016 |

(Continued)

OTHER PUBLICATIONS

International Search Report for PCT Application No. PCT/JP2019/017694, dated Jul. 9, 2019.

*Primary Examiner* — Hibret A Woldekidan

(57) ABSTRACT

An object is to perform wavelength filtering of an optical signal while preventing filter narrowing in an optical transmission apparatus. A branching unit branches a wavelength-multiplexed optical signal including an optical signal of a first wavelength into two optical signals. A wavelength selection unit blocks an optical signal of a first wavelength band including the first wavelength in the optical signal. A filter unit allows passage of an optical signal of a second wavelength band including the first wavelength in the optical signal. A multiplexing unit multiplexes and the optical signal and an optical signal of a second wavelength. The second wavelength band is wider than the first wavelength band.

8 Claims, 12 Drawing Sheets

(58) Field of Classification Search
CPC .. H04J 14/021; H04J 14/0213; H04J 14/0217; H04J 14/0256; H04J 14/0209; H04J 14/0212; H04J 14/0241; H04J 14/028; H04J 14/0284; H04J 14/0201; H04Q 2011/0009; H04Q 2011/0016; H04Q 2011/0015; H04B 10/50; H04B 10/0779; H04B 10/07955; H04B 10/07957; H04B 10/0799; H04B 10/564
USPC ................. 398/79, 68–72, 82–85, 87, 83
See application file for complete search history.

(56) References Cited

U.S. PATENT DOCUMENTS

| | | | |
|---|---|---|---|
| 2015/0381276 A1 | 12/2015 | Saito et al. | |
| 2016/0204875 A1 | 7/2016 | Araki et al. | |
| 2016/0352449 A1* | 12/2016 | Honda | H04J 14/0221 |
| 2019/0064437 A1 | 2/2019 | Matsuyama et al. | |

FOREIGN PATENT DOCUMENTS

| | | |
|---|---|---|
| JP | 2016-131273 A | 7/2016 |
| JP | 2016-220128 A | 12/2016 |
| WO | 2012/094578 A1 | 7/2012 |
| WO | 2017/150278 A1 | 9/2017 |

* cited by examiner

OPTICAL TRANSMISSION APPARATUS, OPTICAL COMMUNICATION SYSTEM, AND OPTICAL SIGNAL TRANSMISSION METHOD

This application is a National Stage Entry of PCT/JP2019/017694 filed on Apr. 25, 2019, which claims priority from Japanese Patent Application 2018-168150 filed on Sep. 7, 2018, the contents of all of which are incorporated herein by reference, in their entirety.

TECHNICAL FIELD

The present invention relates to an optical transmission apparatus, an optical communication system, and an optical signal transmission method.

BACKGROUND ART

In a submarine optical communication system that is an aspect of an optical communication system, optical communication is performed between base stations on land by connecting them through a submarine cable. In such an optical communication system, to increase transmission capacity, a wavelength division multiplexing (WDM) transmission method in which optical signals of different wavelengths are multiplexed and transmitted is applied. In the WDM transmission method, to transmit an optical signal of a desired wavelength to a destination, transmission control is performed for each wavelength by multiplexing (ADD) the optical signal of the desired wavelength with a wavelength-multiplexed optical signal or by demultiplexing (DROP) the optical signal of the desired wavelength from the wavelength-multiplexed optical signal.

An optical transmission apparatus including an optical multiplexing/demultiplexing unit for performing ADD/DROP of the optical signal is disposed in a terminal station on land and a submarine apparatus. The optical multiplexing/demultiplexing unit performs wavelength filtering on an input wavelength-multiplexed optical signal to perform ADD/DROP of the optical signal, and it is known that so-called filter narrowing in which a wavelength band (Bandwidth) of the optical signal is narrowed when the wavelength filtering has been performed occurs (PTL1).

To prevent the filter narrowing, PTL1 proposes a configuration in which a passing wavelength band of an optical filter overlaps with a wavelength band of a channel adjacent to a passing channel.

CITATION LIST

Patent Literature

PTL1: International Publication No. 2017/150278

SUMMARY OF INVENTION

Technical Problem

Wavelength bands constituting the wavelength-multiplexed optical signal includes a wavelength band that is not an object of ADD/DROP by the optical transmission apparatus (Passing wavelength band to be transmitted), and the optical transmission apparatus may also perform the wavelength filtering on the optical signal of the passing wavelength band to be transmitted. Since it is assumed that a frequency of the wavelength filtering performed on the optical signal of the passing wavelength band to be transmitted in an optical signal transmission process is greater than that of the optical signal of the wavelength band that is the object of ADD/DROP, it is particularly required to suppress the filter narrowing.

Further, to achieve a further increase in the capacity of the optical communication system, it is conceivable to improve frequency utilization efficiency by narrowing an interval between wavelengths of adjacent optical signals in the WDM transmission method. In this case, if the wavelength band passing through the filter is expanded to the wavelength band of the adjacent optical signal for the purpose of suppressing the filter narrowing as described in, for example, PTL1, the optical signal of the wavelength band adjacent to the wavelength band of the optical signal to be transmitted is mixed, which may affect signal quality.

The present invention has been made in view of the above circumstances, and aims to perform wavelength filtering of an optical signal while preventing filter narrowing in an optical signal which is not an object of ADD/DROP in an optical transmission apparatus.

Solution to Problem

An aspect of the present invention is an optical transmission apparatus including: a branching unit configured to branch a wavelength-multiplexed optical signal including an optical signal of a first wavelength into a first branched light and a second branched light; a first wavelength selection unit configured to block an optical signal of a first wavelength band including the first wavelength in the first branched light; a filter unit configured to allow passage of an optical signal of a second wavelength band including the first wavelength in the second branched light; and a multiplexing unit configured to receive an optical signal of a second wavelength, to multiplex an optical signal output from the filter unit and the optical signal of the second wavelength, and to output the multiplexed optical signal, in which the second wavelength band is wider than the first wavelength band.

An aspect of the present invention is an optical communication system including: a first terminal station including an optical transmission apparatus; a second terminal station; and a third terminal station, in which the optical transmission apparatus includes: a branching unit configured to branch a wavelength-multiplexed optical signal including an optical signal of a first wavelength into a first branched light and a second branched light; a first wavelength selection unit configured to block an optical signal of a first wavelength band including the first wavelength in the first branched light; a filter unit configured to allow passage of an optical signal of a second wavelength band including the first wavelength in the second branched light; and a multiplexing unit configured to receive an optical signal of a second wavelength, to multiplex an optical signal output from the filter unit and the optical signal of the second wavelength, and to output the multiplexed optical signal, in which the second wavelength band is wider than the first wavelength band.

An aspect of the present invention is an optical signal transmission method including: branching a wavelength-multiplexed optical signal including an optical signal of a first wavelength into a first branched light and a second branched light; blocking a first wavelength band including the first wavelength in the first branched light; allowing passage of a second wavelength band including the first wavelength in the second branched light; and multiplexing an optical signal of the second wavelength band and the optical signal of the second wavelength, and outputting the multiplexed optical signal, in which the second wavelength band is wider than the first wavelength band.

Advantageous Effects of Invention

According to the present invention, it is possible to perform wavelength filtering of an optical signal while preventing filter narrowing in an optical transmission apparatus.

DESCRIPTION OF EMBODIMENTS

Figure 1:
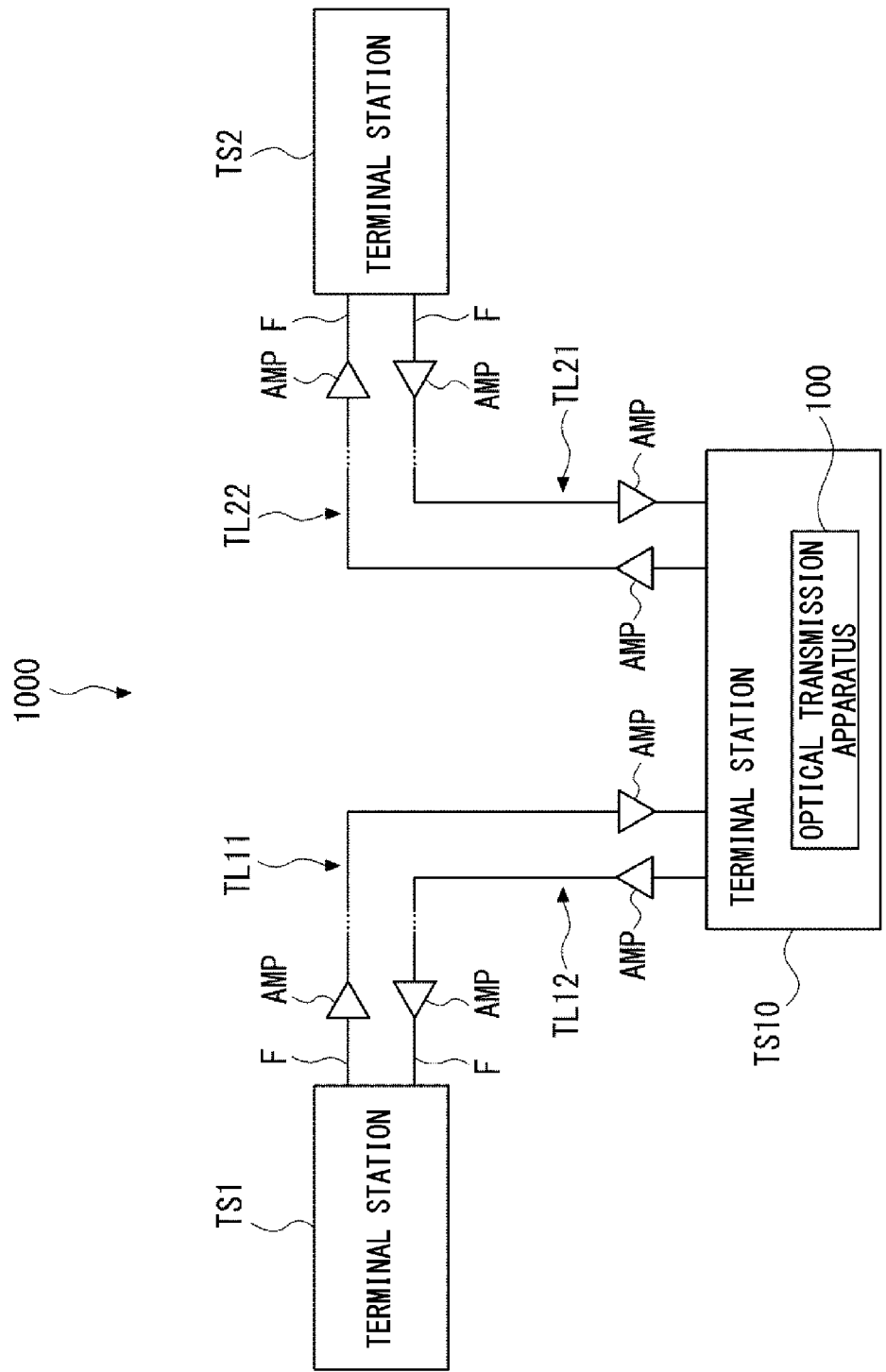
FIG. 1 is a diagram schematically showing a configuration example of an optical communication system according to a first example embodiment.

Example embodiments of the present invention will be described below with reference to the drawings. In the drawings, the same elements are denoted by the same reference numerals, and thus a repeated description is omitted as needed.

First Example Embodiment

An optical transmission apparatus 100 according to a first example embodiment will be described. FIG. 1 shows a basic configuration of an optical communication system 1000 including the optical transmission apparatus 100 according to the first example embodiment. Here, it is assumed that the optical transmission apparatus 100 is installed at a terminal station on land included in the optical communication system 1000 that constitutes a submarine optical network.

FIG. 1 schematically shows a configuration example of the optical communication system 1000 according to the first example embodiment. In this example, the optical communication system 1000 includes terminal stations TS1, TS2, and TS10, an optical amplifier AMP, and an optical fiber F. The terminal stations TS1, TS2, and TS10 are terminal stations installed on land, respectively. The terminal station TS10 includes the optical transmission apparatus 100.

The terminal stations are connected to each other by a transmission line installed on land or on the seabed and including an optical fiber for transmitting an optical signal. A submarine optical transmission apparatus such as an optical amplifier for amplifying a transmitted optical signal and a submarine optical branching apparatus for ADD/DROP of the optical signal is inserted into the transmission line as appropriate.

A transmission line for transmitting an optical signal from the terminal station TS1 (Second terminal station) to the terminal station TS10 (First terminal station) is defined as a transmission line TL11. A transmission line for transmitting an optical signal from the terminal station TS10 to the terminal station TS1 is defined as a transmission line TL12. A transmission line for transmitting an optical signal from the terminal station TS2 (Third terminal station) to the terminal station TS10 is defined as a transmission line TL21. A transmission line for transmitting an optical signal from the terminal station TS10 to the terminal station TS2 is defined as a transmission line TL22.

To amplify an optical signal attenuated by transmission, one or more optical amplifiers AMP are disposed on each of the transmission lines TL11, TL12, TL21, and TL22.

In the present example embodiment, the terminal station TS1 outputs a wavelength-multiplexed optical signal $S_{IN}$ (First wavelength-multiplexed optical signal) to the terminal station TS10 through the transmission line TL11. The wavelength-multiplexed optical signal $S_{IN}$ is a wavelength-multiplexed optical signal of one or more wavelengths (Channels) to be transmitted. The terminal station TS10 outputs a wavelength-multiplexed optical signal $S_{OUT}$ (Second wavelength-multiplexed optical signal) to the terminal station TS2 through the transmission line TL22.

Figure 2:
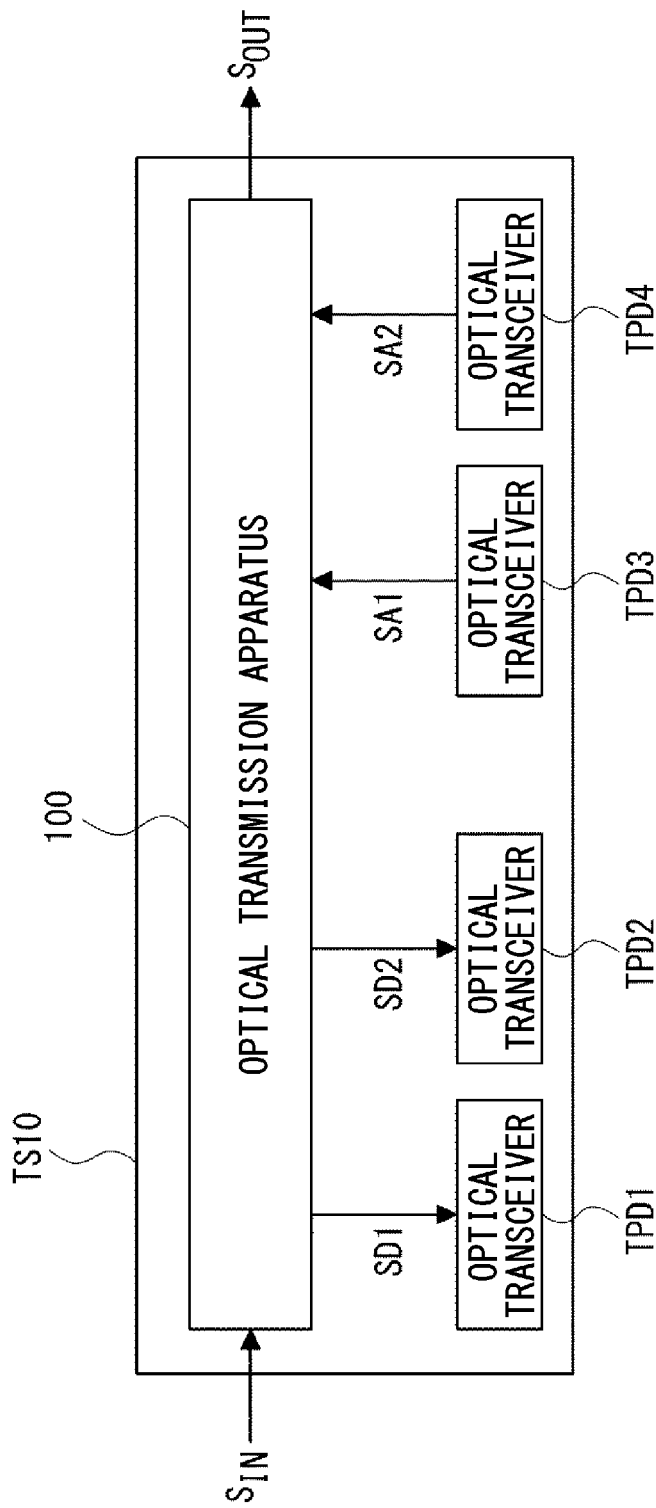
FIG. 2 a diagram schematically showing a configuration of a general terminal station.

A configuration of the terminal station TS10 according to the present example embodiment will be described below. Similar to a general terminal station, the terminal station TS10 has an optical transmission apparatus and a plurality of optical transceivers. FIG. 2 schematically shows the configuration of the terminal station TS10 according to the example embodiment. Here, as shown in FIG. 2, an example in which the terminal station TS10 has the optical transmission apparatus 100 and optical transceivers TPD1 to TPD4 will be described.

The optical transceivers TPD1 to TPD4 are connected to the optical transmission apparatus 100 by, for example, optical fibers, and can communicate optical signals with other terminal stations through the optical transmission apparatus 100. It is not required that the optical transceivers disposed in the terminal station are the same optical transceiver, and optical transceivers having different functions or optical transceivers manufactured by different vendors can be appropriately used.

In this example, the optical transmission apparatus 100 receives the wavelength-multiplexed optical signal $S_{IN}$ from the terminal station TS1. The optical transmission apparatus 100 drops optical signals SD1 and SD2 of predetermined wavelengths from the wavelength-multiplexed optical signal $S_{IN}$. The optical transceivers TPD1 and TPD2 receive the optical signals SD1 and SD2, respectively. The optical transceivers TPD3 and TPD4 output optical signals SA1 and SA2 to the optical transmission apparatus 100, respectively. The optical transmission apparatus 100 adds the optical signals SA1 and SA2 to an optical signal obtained by dropping the optical signals SD1 and SD2 from the wavelength-multiplexed optical signal $S_{IN}$, and outputs the resultant optical signal as a wavelength-multiplexed optical signal $S_{OUT}$.

Figure 3:
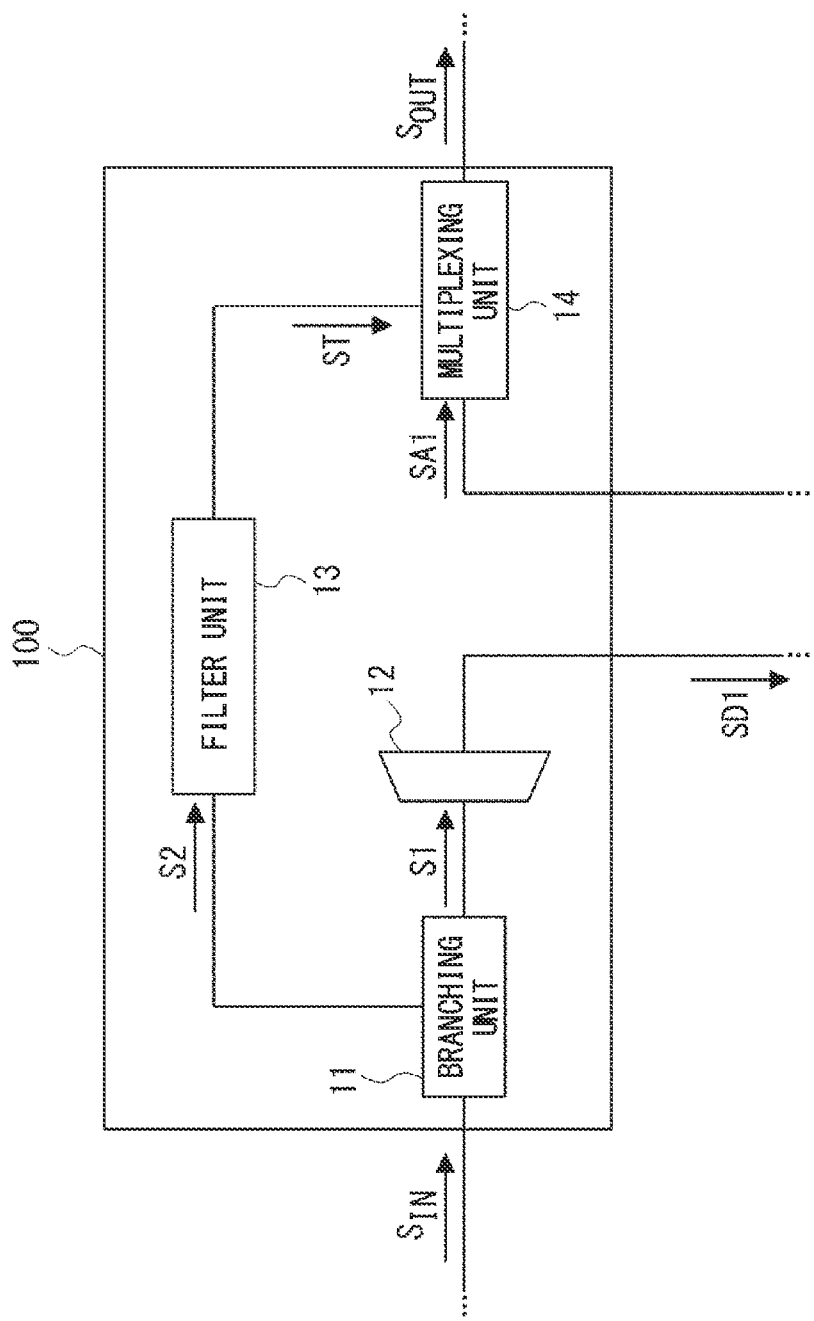
FIG. 3 is a diagram schematically showing a configuration of an optical transmission apparatus according to the first example embodiment.

Next, the optical transmission apparatus 100 according to the present example embodiment will be described. The optical transmission apparatus 100 according to the present example embodiment is configured to suppress filter narrowing of optical signals other than the optical signals added or dropped by the optical transmission apparatus 100. FIG. 3 schematically shows a configuration of the optical transmission apparatus 100 according to the first example embodiment. The optical transmission apparatus 100 includes a branching unit 11, a wavelength selection unit 12, a filter unit 13, and a multiplexing unit 14.

The branching unit 11 receives the wavelength-multiplexed optical signal $S_{IN}$ (First wavelength-multiplexed optical signal) through the transmission line TL11, and branches the wavelength-multiplexed optical signal $S_{IN}$ into two signals. One of the branched optical signal S1 (First branched light) is output to the wavelength selection unit 12, and the other branched optical signal S2 (Second branching light) is output to the filter unit 13. That is, in the branching unit 11, the wavelength-multiplexed optical signal $S_{IN}$ is simply branched into two signals without being wavelength-filtered. The branching unit 11 may be configured by an optical component such as a coupler.

The wavelength selection unit 12 (First wavelength selection unit) selects (Drops), from the optical signal S1, an optical signal that is received by an optical transceiver (For example, the optical transceivers TPD1 and TPD2 in FIG. 1) disposed in the optical transmission apparatus 100 and corresponds to at least one channel. For example, the wavelength selection unit 12 may drop one or both of the optical signals SD1 and SD2. Here, it is assumed that the wavelength selection unit 12 drops the optical signal SD1. The wavelength selection unit 12 may be configured as a WSS, for example.

In general, in the WSS, a wavelength band of a passing optical signal can be set to each port. That is, optical signals of different wavelength bands can be set as passing optical signals to the ports of the WSS, respectively. Therefore, it is impossible to set optical signals having the same wavelength as the passing optical signals to two or more ports.

Figure 4:
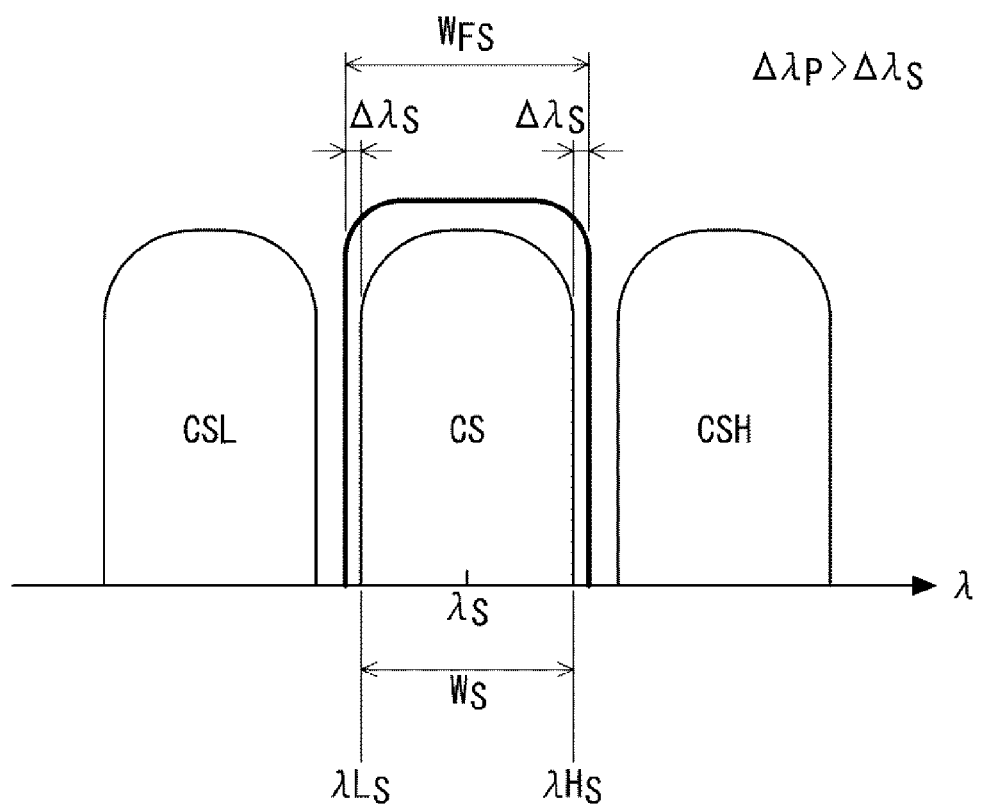
FIG. 4 is a diagram showing wavelength filtering in a wavelength selection unit.

FIG. 4 shows wavelength filtering in the wavelength selection unit 12. As shown in FIG. 4, for example, a selected channel CS to be selected is included in successive channels. An adjacent channel on a short wavelength side of the selection channel CS is defined as CSL, and an adjacent channel on a long wavelength side is defined as CSH. A wavelength selection unit 12 selects an optical signal of a wavelength band having a channel width of the selected channel CS or having a channel width approximate to the channel width or the channel width of the selected channel CS.

Specifically, when a wavelength band of the selected channel CS is defined as $W_S$, a center wavelength of the selected channel is defined as $\lambda_S$ (First wavelength), and a wavelength margin is defined as $\Delta\lambda_S$, the wavelength selection unit 12 selects an optical signal of a wavelength band $W_{FS}$ (First wavelength band) expressed by the following expression. Here, the wavelength margin is a wavelength band provided adjacent to the wavelength band of the selected channel CS on both the short wavelength side and the long wavelength side of the wavelength band of the selected channel CS to prevent loss due to filtering of the optical signal in the wavelength band of the selected channel CS.

$$\lambda_S - \left(\frac{W_S}{2} + \Delta\lambda_S\right) \le W_{FS} \le \lambda_S + \left(\frac{W_S}{2} + \Delta\lambda_S\right) \qquad [1]$$

That is, a lower limit of the wavelength band $W_{FS}$ of the optical signal selected by the wavelength selection unit 12 is a wavelength obtained by subtracting ½ of the wavelength band $W_S$ of the selected channel and the wavelength margin $\Delta\lambda_S$ (Third wavelength margin) from the center wavelength $\lambda_S$ of the selected channel. An upper limit of the wavelength band $W_{FS}$ (Fourth wavelength margin) of the optical signal selected by the wavelength selection unit 12 is a wavelength obtained by adding ½ of the wavelength band $W_S$ of the selected channel and the wavelength margin $\Delta\lambda_S$ to the center wavelength $\lambda_S$ of the selected channel.

When a lower limit wavelength of the selected channel is defined as $\lambda L_S$ and an upper limit wavelength is defined as $\lambda H_S$, the expression [1] can be rewritten as the following expression [2].

$$\lambda L_S - \Delta\lambda_S \le W_{FS} \le \lambda H_S + \Delta\lambda_S \qquad [2]$$

That is, the lower limit of the wavelength band $W_{FS}$ of the optical signal selected by the wavelength selection unit 12 is a wavelength obtained by subtracting the wavelength margin $\Delta\lambda_S$ from the lower limit wavelength Us of the selected channel, and the upper limit of the wavelength band $W_{FS}$ of the optical signal selected by the wavelength selection unit 12 is a wavelength obtained by adding the wavelength margin $\Delta\lambda_S$ to the upper limit wavelength $\lambda H_S$ of the selected channel.

Thus, the optical signal of the selected channel CS can be selected while preventing or suppressing the mixing of the optical signals of the wavelengths of the adjacent channels CSL and CSH.

Although only one selected channel has been described, a plurality of channels may be selected as selected channels. The selected channels may be successive channels. Some or all of the selected channels may be non-successive channels.

The filter unit 13 is a wavelength filter, and extracts an optical signal of a desired channel from the optical signal S2. Specifically, the filter unit 13 filters the optical signal S2 and outputs an optical signal ST corresponding to the channel to be transmitted through a trunk line to the multiplexing unit 14.

Figure 5:
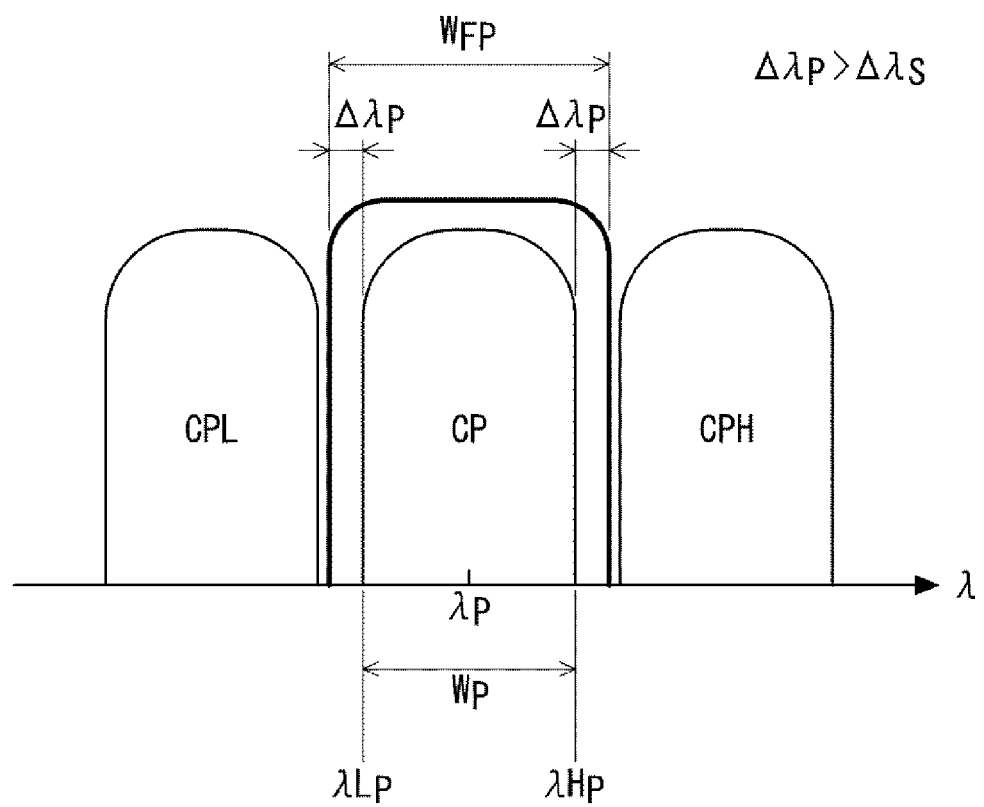
FIG. 5 is a diagram showing wavelength filtering in a filter unit.

FIG. 5 shows wavelength filtering in the filter unit 13. As shown in FIG. 5, successive channels include a passing channel CP passing through the filter unit 13. An adjacent channel on a short wavelength side of the passing channel CP is defined as CPL, and an adjacent channel on a long wavelength side is defined as CPH. An optical signal of a wavelength band wider than the channel width of the passing channel CP passes through the filter unit 13.

Specifically, when a wavelength band (Also referred to as a passing wavelength band) of the passing channel CP is defined as $W_P$, a center wavelength (First wavelength) of the passing channel CP is defined as $\lambda_P$, and a wavelength margin is defined as $\Delta\lambda_P$, the filter unit 13 selects an optical signal of the passing wavelength band $W_{FP}$ (Second wavelength band) expressed by the following equation. Here, the wavelength margin is a wavelength band provided adjacent to the wavelength band of the passing channel CP on both the short wavelength side and the long wavelength side of the wavelength band of the passing channel CP in order to prevent loss due to filtering of the optical signal in the wavelength band of the passing channel CP.

$$\lambda_P - \left(\frac{W_P}{2} + \Delta\lambda_P\right) \leq W_{FP} \leq \lambda_P + \left(\frac{W_P}{2} + \Delta\lambda_P\right) \qquad [3]$$

That is, a lower limit of the passing wavelength band $W_{FP}$ of the optical signal passing through the filter unit 13 is a wavelength obtained by subtracting ½ of the wavelength band $W_P$ of the passing channel CP and the wavelength margin $\Delta\lambda_P$ (Second wavelength margin) from the center wavelength $\lambda_P$ (First wavelength margin) of the passing channel. An upper limit of the passing wavelength band $W_{FP}$ of the optical signal passing through the filter unit 13 is a wavelength obtained by adding ½ of the wavelength band $W_P$ of the passing channel CP and the wavelength margin $\Delta\lambda_P$ to the center wavelength $\lambda_P$ of the passing channel.

When the lower limit wavelength of the passing channel is defined as $\lambda L_P$ and the upper limit wavelength is defined as $\lambda H_P$, the expression [3] can be rewritten as the following expression [4].

$$\lambda L_P - \Delta\lambda_P \leq W_{FP} \leq \lambda H_P + \Delta\lambda_P \qquad [4]$$

That is, the lower limit of the passing wavelength band $W_{FP}$ of the optical signal passing through the filter unit 13 is a wavelength obtained by subtracting the wavelength margin $\Delta\lambda_P$ from the lower limit wavelength $\lambda L_P$ of the passing channel, and the upper limit of the passing wavelength band $W_{FP}$ of the optical signal passing through the filter unit 13 is a wavelength obtained by adding the wavelength margin $\Delta\lambda_P$ to the upper limit wavelength $\lambda H_P$ of the passing channel.

Thus, since the passing wavelength band $W_{FP}$ of the optical signal passing through the filter unit 13 becomes wider than the wavelength band $W_P$ of the passing channel, the filter narrowing of the optical signal passing through the filter unit 13 can be suppressed.

In the present example embodiment, each wavelength margin of the optical transmission apparatus 100 is set to cause the wavelength margin $\Delta\lambda_P$ set by the filter unit 13 to be wider than the wavelength margin $\Delta\lambda_S$ set by the wavelength selection unit 12. Therefore, it is possible to cause the filter narrowing of the optical signal passing through the filter unit 13 to be smaller than that of the wavelength selection unit 12.

Figure 6:
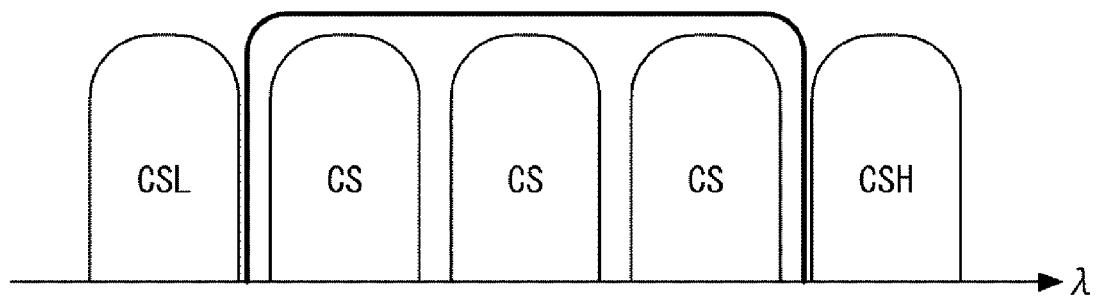
FIG. 6 is a diagram showing an example of a channel passing through the filter unit.
Figure 7:
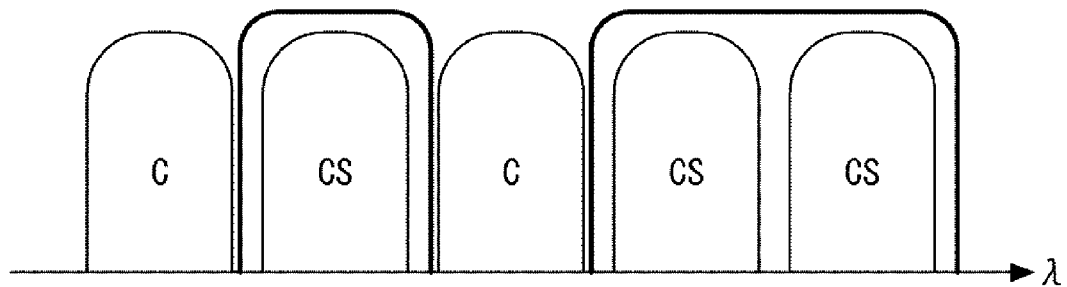
FIG. 7 is a diagram showing an example of a channel passing through the filter unit.

Note that, although the example having the single passing channel has been described, the passing channel is not limited to this example. The filter unit 13 may allow passage of a plurality of channels. FIG. 6 shows an example of channels passing through the filter unit. As shown in FIG. 6, the channels passing through the filter unit 13 may be successive channels. FIG. 7 shows another example of channels passing through the filter unit. As shown in FIG. 7, some or all of the channels passing through the filter unit 13 may be non-successive channels. In FIG. 7, a channel that does not pass through the filter unit 13 is indicated by a sign C.

In the present example embodiment, although it has been described that there is a gap between the channels, a gap of an arbitrary width such as a so-called guard band may be provided to ensure signal quality of each channel. In this case, it is desirable that the lower limit wavelength and the upper limit wavelength of the optical signal passing through the filter unit are located in the gap between the channels.

The gap between the channels is not necessary, and there may be no gap between the channels. In this case, the lower limit wavelength and the upper limit wavelength of the optical signal passing through the filter unit may be set in the channel adjacent to the selected channel as long as the signal quality of the selected channel is ensured.

The multiplexing unit 14 multiplexes the optical signal ST output from the filter unit 13 and the optical signal of at least one channel (Second channel) selected from the optical signals output from the optical transceiver (For example, one or both of the optical transceivers TPD3 and TPD4 of FIG. 2) provided in the optical transmission apparatus 100, and outputs the wavelength-multiplexed optical signal $S_{OUT}$ that has been multiplexed to the terminal station TS2 through the transmission line TL22. Here, it is assumed that the multiplexing unit 14 receives the optical signal SA1 from the optical transceiver TPD3.

Figure 8:
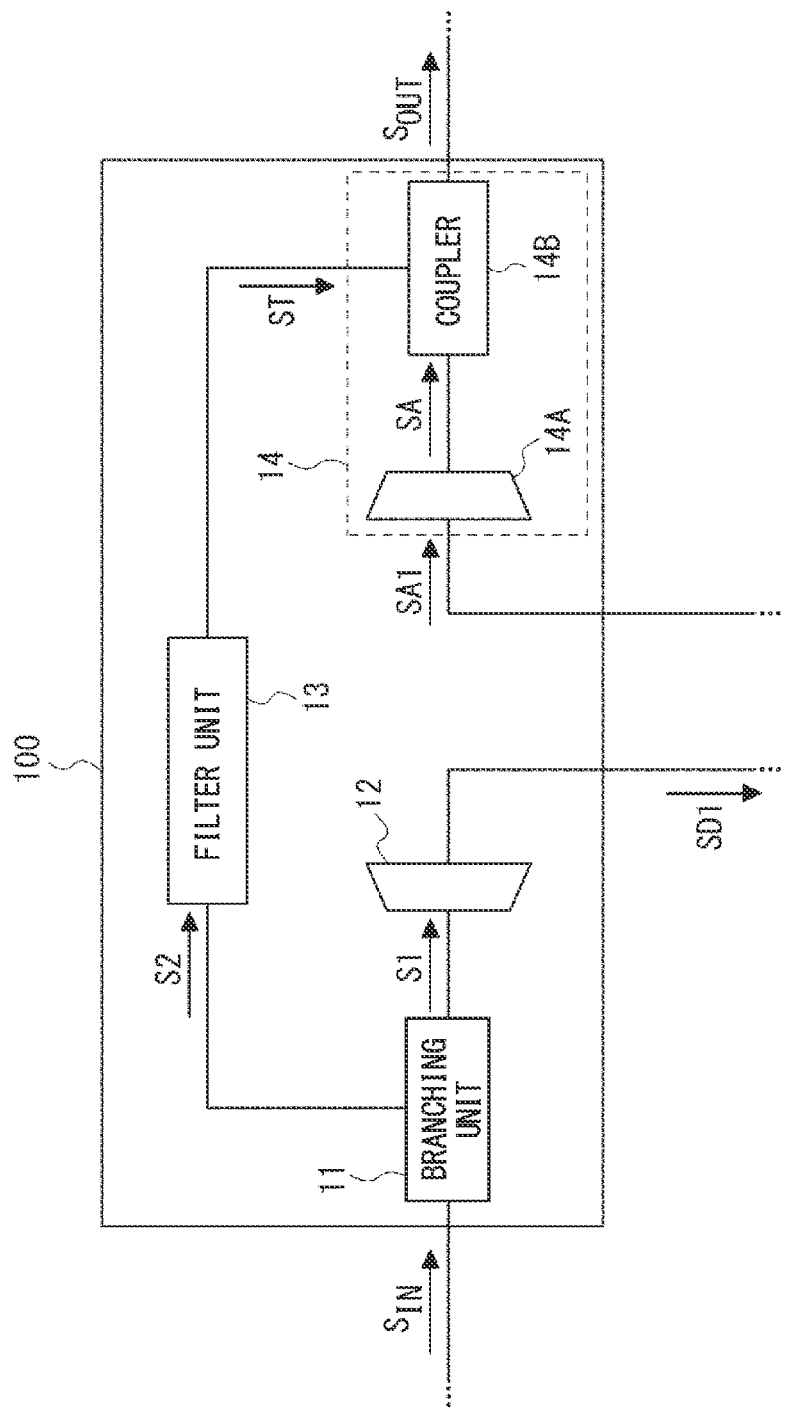
FIG. 8 is a diagram showing the configuration of the optical transmission apparatus according to the first example embodiment in more detail.

FIG. 8 shows the configuration of the optical transmission apparatus 100 according to the first example embodiment in more detail. The multiplexing unit 14 includes a wavelength selection unit 14A and a coupler 14B. The wavelength selection unit 14A may be configured as a WSS.

The wavelength selection unit 14A receives the optical signal SA1 output from the optical transceiver TPD1. The optical signal SA1 includes an optical signal of a wavelength band including at least one wavelength (Second wavelength) to be selected by the wavelength selection unit 14A. The wavelength selection unit 14A selects an optical signal SA corresponding to a wavelength band of a predetermined channel from the optical signal SAL and outputs the optical signal SA to the coupler 14B. The coupler 14B multiplexes the optical signal ST output from the filter unit 13 with the optical signal SA to output the wavelength-multiplexed optical signal $S_{OUT}$. Since the selection method of the optical signal in the wavelength selection unit 14A is the same as that in the wavelength selection unit 12, a description thereof will be omitted.

In the present configuration, the optical signal input to the optical transmission apparatus 100 is branched into two by the branching unit 11. Since wavelength filtering is not performed in the branching unit 11, filter narrowing is not caused in the branching unit 11. The filtering of the optical signal is performed not by the wavelength selection unit such as a WSS having a narrow wavelength band to be passed but by the filter unit 13 having the sufficiently wide wavelength band to be passed. Therefore, the filter narrowing in the filter unit 13 can be preferably suppressed or prevented. The optical signal filtered by the filter unit 13 is multiplexed with the optical signal output from the optical transceiver by the multiplexer unit 14 and output.

If a channel corresponding to the optical signal SA and a channel corresponding to the optical signal ST output from the filter unit 13 are adjacent to each other, when these two optical signals are multiplexed, an overlapping wavelength band may be generated. Therefore, to suppress degradation of the optical signal due to the overlapping, the wavelength margin $\Delta\lambda_P$ in the filter unit 13 is preferably within a range of 1 to 3 GHz in terms of frequency.

As described above, according to the present configuration, it is possible to suppress or prevent the filter narrowing of the optical signal of the channel transmitted through the trunk line. As a result, the filter narrowing due to the filtering by the WSS that occurs in the general optical transmission apparatus can be avoided.

Second Example Embodiment

Figure 9:
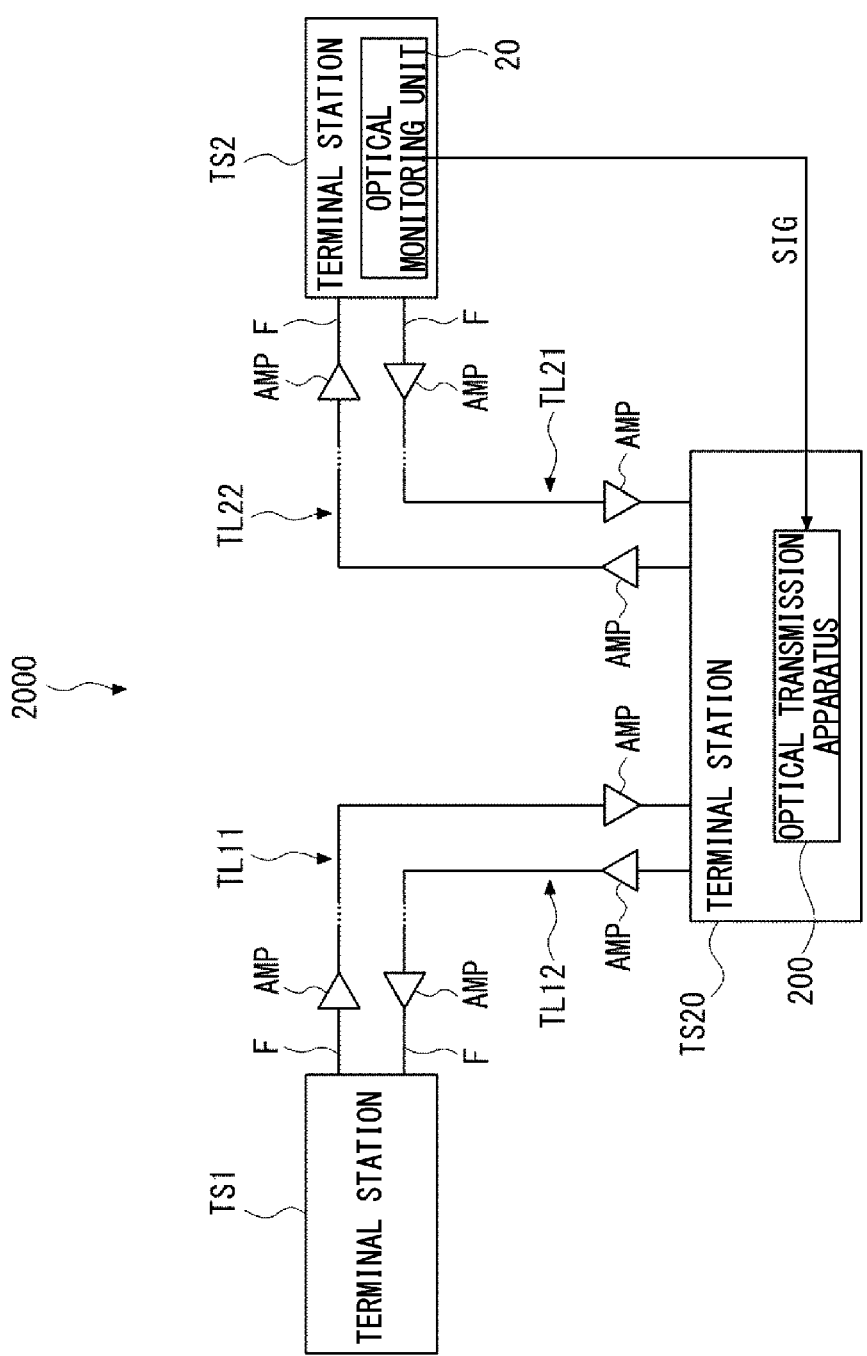
FIG. 9 is a diagram schematically showing a configuration of an optical communication system according to a second example embodiment.

An optical transmission apparatus according to a second example embodiment will be described. FIG. 9 schematically shows a configuration of an optical communication system according to the second example embodiment. An optical communication system 2000 according to the second example embodiment has a configuration in which the terminal station TS10 of the optical communication system 1000 according to the first example embodiment is replaced with a terminal station TS20.

In the present embodiment, the terminal station TS2 includes an optical monitoring unit 20. The optical monitoring unit 20 receives the wavelength-multiplexed optical signal $S_{OUT}$ output from the terminal station TS20, monitors signal quality such as an optical intensity of the wavelength-multiplexed optical signal $S_{OUT}$ and a spectrum of each channel, and outputs a signal SIG indicating the monitoring result to the terminal station TS20.

Figure 10:
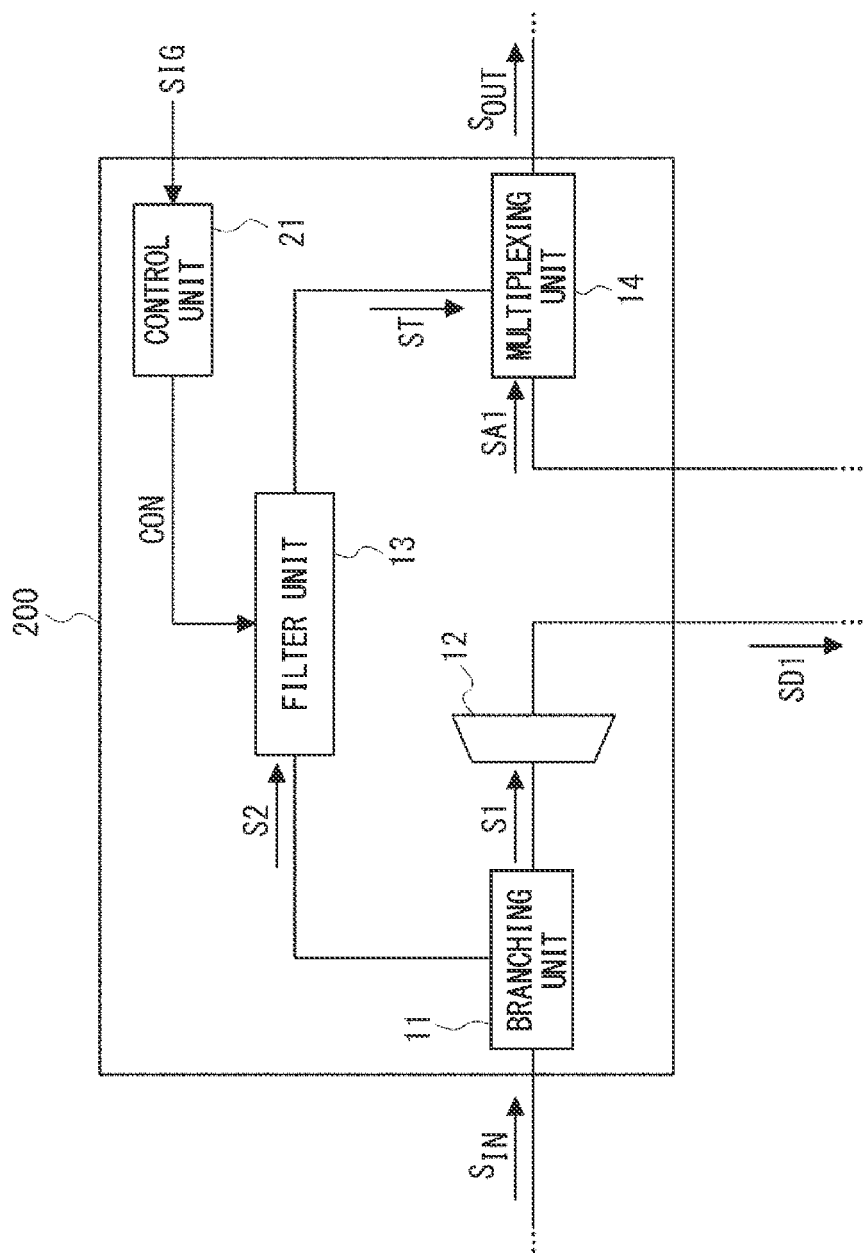
FIG. 10 is a diagram schematically showing a configuration of an optical transmission apparatus according to the second example embodiment.

The terminal station TS20 has a configuration in which the optical transmission apparatus 100 of the terminal station TS10 according to the first example embodiment is replaced with an optical transmission apparatus 200. FIG. 10 schematically shows a configuration of the optical transmission apparatus 200 according to the second example embodiment. The optical transmission apparatus 200 has a configuration in which a control unit 21 is added to the optical transmission apparatus 100 according to the first example embodiment.

The control unit 21 receives the signal SIG output from the optical monitoring unit 20 of the terminal station TS2, and outputs a control signal CON to the filter unit 13 in response to the signal SIG, thereby adjusting the passing wavelength band $W_{FP}$ of the optical signal passing through the filter unit 13.

As described above, according to the present configuration, by monitoring the wavelength-multiplexed optical signal $S_{OUT}$ output from the optical transmission apparatus 200 of the terminal station TS20 by the other terminal station TS2, the passing wavelength band $W_{FP}$ of the filter unit 13 can be adjusted. Thus, the optical signal passing through the filter unit 13 can be of the desired quality. Further, even when a fluctuation occurs in the optical signal or the like during the operation of the optical communication system, the passing wavelength band $W_{FP}$ of the filter unit 13 can be dynamically controlled.

Third Example Embodiment

Figure 11:
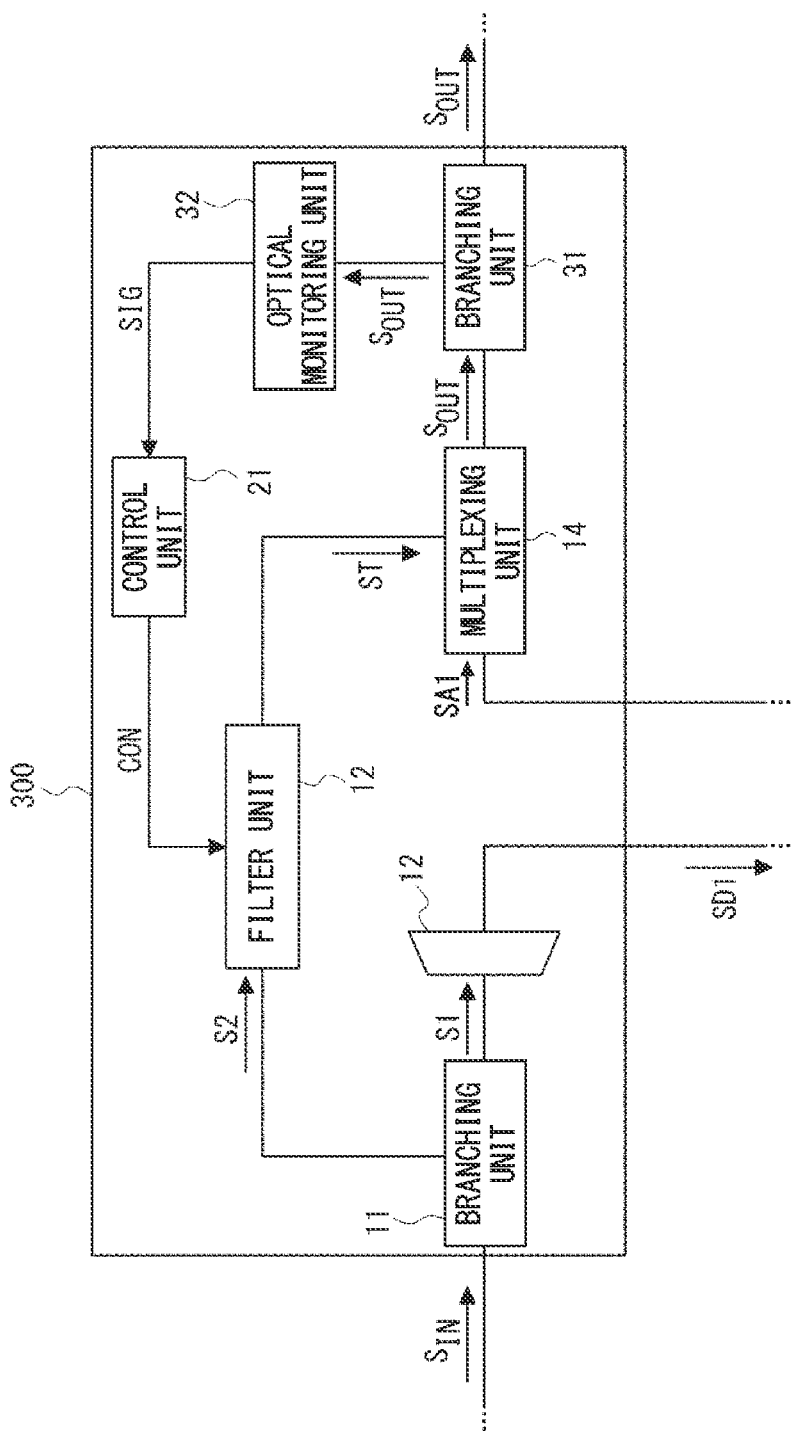
FIG. 11 is a diagram schematically showing a configuration of an optical transmission apparatus according to a third example embodiment.

An optical transmission apparatus according to a third embodiment will be described. FIG. 11 schematically shows a configuration of an optical transmission apparatus 300 according to the third example embodiment. The optical transmission apparatus 300 has a configuration in which a branching unit 31 and an optical monitoring unit 32 are added to the optical transmission apparatus 200 according to the second example embodiment.

The branching unit 31 branches a part of the wavelength-multiplexed optical signal $S_{OUT}$ output from the multiplexing unit 14, and outputs the branched wavelength-multiplexed optical signal $S_{OUT}$ to the optical monitoring unit 32.

The optical monitoring unit 32 monitors signal quality such as the optical intensity of the input wavelength-multiplexed optical signal $S_{OUT}$ and the spectrum of each channel, and outputs the signal SIG indicating the monitoring result to the control unit 21.

Similar to the second example embodiment, the control unit 21 adjusts the passing wavelength band $W_{FP}$ of the optical signal passing through the filter unit 13 in response to the signal SIG.

As described above, according to the present configuration, by monitoring the wavelength-multiplexed optical signal $S_{OUT}$ output from the optical transmission apparatus 300 by the optical monitoring unit 32 provided in the optical transmission apparatus 300, the passing wavelength band $W_{FP}$ of the filter unit 13 can be autonomously adjusted. Thus, like the optical transmission apparatus 200, the desired quality of the optical signal passing through the filter unit 13 can be achieved. Further, even when the fluctuation occurs in the optical signal or the like during the operation of the optical communication system, the passing wavelength band $W_{FP}$ of the filter unit 13 can be dynamically controlled.

Fourth Example Embodiment

Figure 12:
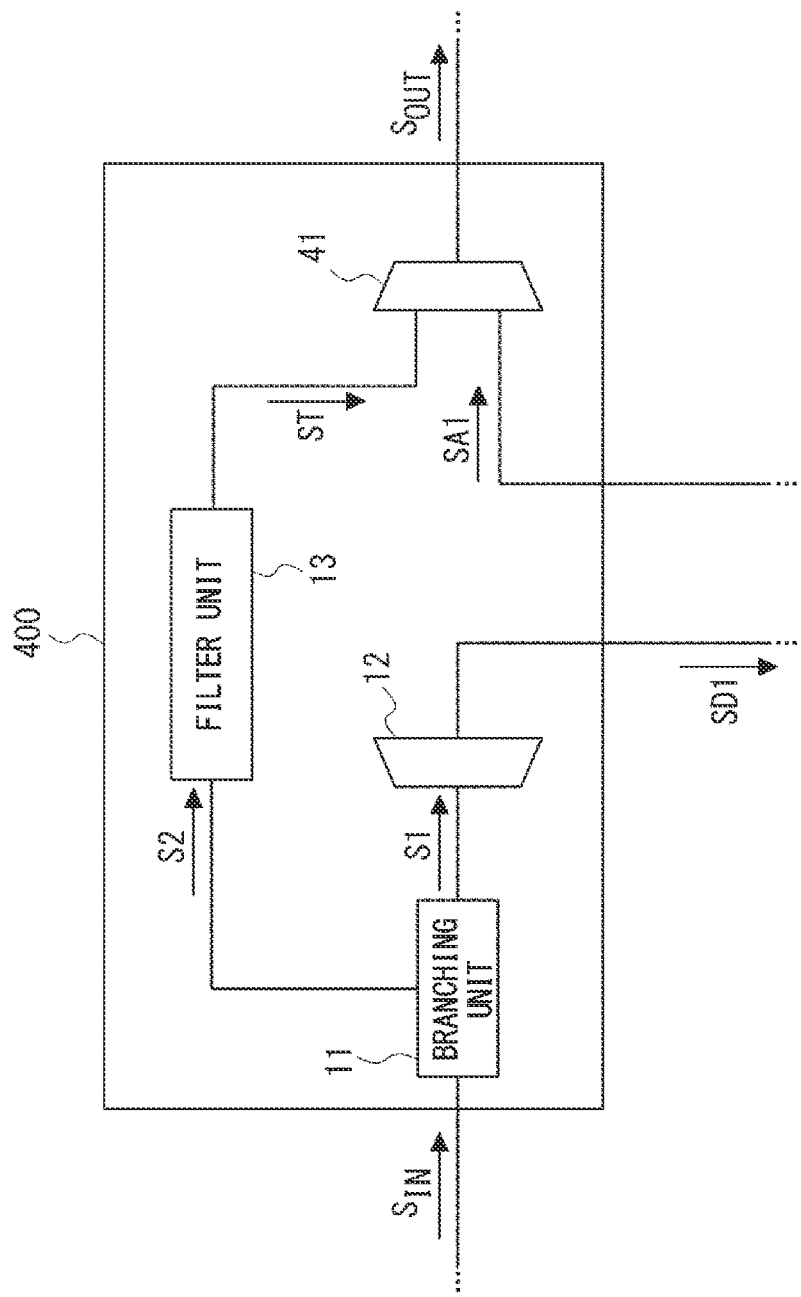
FIG. 12 is a diagram schematically showing a configuration of an optical transmission apparatus according to a fourth example embodiment.

An optical transmission apparatus according to a fourth embodiment will be described. FIG. 12 schematically shows a configuration of an optical transmission apparatus 400 according to the fourth example embodiment. In the optical transmission apparatus 400, the multiplexing unit 14 of the optical transmission apparatus 100 according to the first example embodiment is configured as a wavelength selection unit. Here, it is assumed that the optical transmission apparatus 400 includes a wavelength selection unit 41.

The wavelength selection unit 41 is configured as a wavelength selective switch (WSS) capable of multiplexing a plurality of optical signals having different wavelengths and outputting the resultant wavelength-multiplexed optical signal.

In the optical transmission apparatus 400, in the present configuration, similarly to the optical transmission apparatus 100, the wavelength-multiplexed optical signal $S_{IN}$ is branched by the branching unit 11 without being wavelength-filtered, and the branched optical signal S2 is filtered by the filtering unit 13 while suppressing the filter narrowing. Thereafter, the filtered optical signal ST is filtered with high accuracy by the wavelength selection unit 41. The optical signal SA1 input from the optical transceiver TPD1 to the wavelength selection unit 41 is also filtered with high accuracy to select the optical signal SA. The wavelength selection unit 41 multiplexes the signal obtained by filtering the optical signal ST and the optical signal SA, and outputs the resultant signal as the wavelength-multiplexed optical signal $S_{OUT}$.

In the present configuration, the wavelength width of the optical signal included in the wavelength-multiplexed optical signal $S_{OUT}$ output from the wavelength selection unit 41 can be controlled with high accuracy while suppressing the filter narrowing as in the cases of the above-described example embodiments, and the degradation of the signal quality can be suppressed.

Fifth Example Embodiment

An optical transmission apparatus according to a fifth example embodiment will be described. The optical transmission apparatus according to the fifth example embodiment has a configuration in which a plurality of wavelength selection units similar to the wavelength selection unit 12 of the optical transmission apparatus 100 according to the first example embodiment are disposed.

Figure 13:
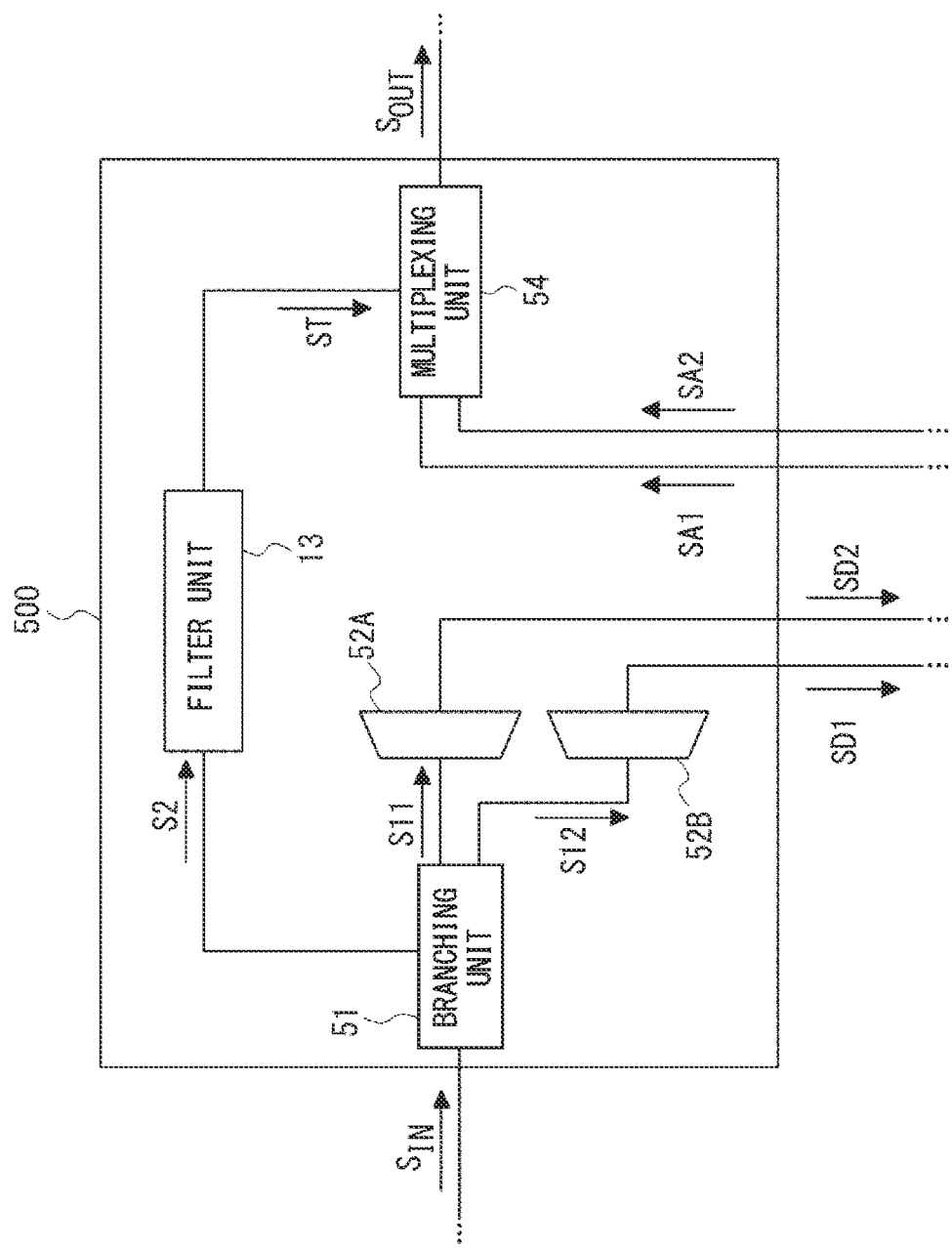
FIG. 13 is a diagram schematically showing a configuration of an optical transmission apparatus according to a fifth example embodiment.

FIG. 13 schematically shows a configuration of an optical transmission apparatus 500 according to the fifth example embodiment. The optical transmission apparatus 500 has a configuration in which the branching unit 11 of the optical transmission apparatus 100 according to the first example embodiment is replaced with a branching unit 51, the wavelength selection unit 12 is replaced with wavelength selection units 52A and 52B, and the multiplexing unit 14 is replaced with a multiplexing unit 54.

The branching unit 51 receives the wavelength-multiplexed optical signal $S_{IN}$ through the transmission line TL11, and branches the wavelength-multiplexed optical signal $S_{IN}$ into three signals. The branched optical signals S11 and S12 are respectively output to the wavelength selection units 52A and 52B, and the optical signal S2 is output to the filter unit 13. That is, in the branching unit 51, the wavelength-multiplexed optical signal $S_{IN}$ is simply branched into three signals without being wavelength-filtered.

Similar to the wavelength selection unit 12, the wavelength selection unit 52A filters the optical signal S11 to select the optical signal SD1. The wavelength selection unit 52A outputs the selected optical signal SD1 to the optical transceiver TPD1. Similar to the wavelength selection unit 12, the wavelength selection unit 52B filters the optical signal S12 to select the optical signal SD2. The wavelength selection unit 52B outputs the selected optical signal SD2 to the optical transceiver TPD2.

The wavelength selection units 52A and 52B select channels with high accuracy to prevent an optical signal of a channel adjacent to the selected channel from being mixed into an optical signal output to the optical transceiver. Therefore, the wavelength selection units 52A and 52B may be configured as, for example, the WSS.

The multiplexing unit 54 multiplexes the optical signal ST output from the filter unit 13 and the optical signals SA1 and SA2 respectively output from the optical transceivers TPD3 and TPD4, and outputs the multiplexed wavelength-multiplexed optical signal $S_{OUT}$ to the terminal station TS2 through the transmission line TL12.

As described above, in the optical transmission apparatus, it is possible to achieve the configuration in which a plurality of wavelength selection units are disposed for selecting the optical signals of the desired channels from the optical signals obtained by branching the wavelength-multiplexed optical signal $S_{IN}$ so as to receive a plurality of optical signals input from the optical transceiver are received. In the present configuration, two wavelength selection units are disposed for selecting the optical signals of the desired channels from the optical signals obtained by branching the wavelength-multiplexed optical signal $S_{IN}$, and receiving two optical signals input from the optical transceiver. It should be appreciated that three or more wavelength selection units for selecting the optical signals of the desired channels from the optical signals obtained by branching the wavelength-multiplexed optical signal $S_{IN}$ and receiving three or more optical signals input from the optical transceiver may be disposed.

Other Example Embodiments

The present invention is not limited to the above-described example embodiments, and can be modified as appropriate without departing from the scope of the invention. For example, in the above example embodiments, the configuration of the optical transmission apparatus has been described by focusing on the wavelength-multiplexed optical signal transmitted from the terminal station TS1 to the terminal station TS2. However, it should be appreciated that the same configuration may be applied for adding/dropping of the wavelength-multiplexed optical signal transmitted from the terminal station TS2 to the terminal station TS1. Further, it should be appreciated that, in the optical transmission apparatus, both the wavelength-multiplexed optical signal transmitted from the terminal station TS1 to the terminal station TS2 and the wavelength-multiplexed optical signal transmitted from the terminal station TS2 to the terminal station TS1 may be added/dropped.

In the above example embodiments, although the example in which the optical transmission apparatus is installed in the terminal station on land has been described, the optical transmission apparatus may be installed not only on land but also in facilities on the sea or in the sea.

In the above example embodiments, the optical transmission apparatus has been described as being configured separately from the optical transceiver such as a transponder, but the configuration of the optical transmission apparatus is not limited. It should be appreciated that the optical transmission apparatus may be configured to include the optical transceiver such as the transponder.

The width of the first wavelength margin and the width of the second wavelength margin of the filter unit 13 may be the same or different. The width of the third wavelength margin and the width of the fourth wavelength margin of the wavelength selection unit may be the same or different.

The optical transmission apparatus according to the above-described example embodiments have been described to perform ADD/DROP of the optical signal transmitted through the trunk line and to be inserted into the trunk line between the terminal station TS1 and the terminal station TS2. However, the terminal station TS10 in which the optical transmission apparatus according to the above-described example embodiment is installed may be connected to other terminal stations through a branch line. In this case, the optical transmission apparatus may output the optical signal dropped from the wavelength-multiplexed optical signal to the terminal station connected by the branch line, or may add the optical signal input from the terminal station connected by the branch line to the wavelength-multiplexed optical signal.

Although the present invention has been described above with reference to the embodiments, the present invention is not limited by the foregoing. Various changes in the structure and details of the present invention can be understood by a person skilled in the art within the scope of the invention.

This application claims priority on the basis of Japanese Patent Application No. 2018-168150, filed Sep. 7, 2018, the entire disclosure of which is incorporated herein by reference.

REFERENCE SIGNS LIST 11, 31, 51 BRANCHING UNITS
12, 14A, 41, 52A, 52B WAVELENGTH SELECTION UNITS
13 FILTER UNIT
14, 54 MULTIPLEXING UNITS
14B COUPLER
21 CONTROL UNIT
31 BRANCHING UNIT
20, 32 OPTICAL MONITORING UNITS 100, 200, 300, 400, 500 OPTICAL TRANSMISSION APPARATUS
1000, 2000 OPTICAL COMMUNICATION SYSTEMS
AMP OPTICAL AMPLIFIER
TL11, TL12, TL21, TL22 TRANSMISSION LINES
C CHANNEL
CP PASSING CHANNEL
CS SELECTED CHANNEL
F OPTICAL FIBER
SIG SIGNAL
S1, S2, S11, S12, SA1, SA2, SD1, SD2, ST OPTICAL SIGNALS
$S_{IN}$, $S_{OUT}$ WAVELENGTH-MULTIPLEXED OPTICAL SIGNALS
TPD1 TO TPD4 OPTICAL TRANSCEIVERS
TS1, TS2, TS10, TS20 TERMINAL STATIONS

What is claimed is:

1. An optical transmission apparatus comprising:
a branching unit configured to branch a wavelength-multiplexed optical signal including an optical signal of a first wavelength into a first branched light and a second branched light;
a first wavelength selection unit configured to block an optical signal of a first wavelength band including the first wavelength in the first branched light;
a filter unit configured to allow passage of an optical signal of a second wavelength band including the first wavelength in the second branched light; and
a multiplexing unit configured to receive an optical signal of a second wavelength, to multiplex an optical signal output from the filter unit and the optical signal of the second wavelength, and to output the multiplexed optical signal, wherein
the second wavelength band is wider than the first wavelength band, wherein
the second wavelength band is a wavelength band that includes the first wavelength band, a first wavelength margin provided on a short wavelength side of the first wavelength band, and a second wavelength margin provided on a long wavelength side of the first wavelength band,
the first wavelength band is a wavelength band that includes a wavelength band of an optical signal output from the first wavelength selection unit, a third wavelength margin provided on a short wavelength side of a wavelength band of an optical signal output from the first wavelength selection unit, and a fourth wavelength margin provided on a long wavelength side of the wavelength band of the optical signal output from the first wavelength selection unit,
the first wavelength margin is wider than the third wavelength margin, and
the third wavelength margin is wider than the fourth wavelength margin.

2. The optical transmission apparatus according to claim 1, wherein the first wavelength margin and the second wavelength margin are provided between the first wavelength band and a wavelength band adjacent to the first wavelength band.

3. The optical transmission apparatus according to claim 1, further comprising a control unit configured to receive a monitoring signal indicating a result of monitoring the optical signal multiplexed by the multiplexing unit, and to control the second wavelength band in response to the monitoring signal.

4. The optical transmission apparatus according to claim 3, further comprising an optical monitoring unit configured to monitor the optical signal multiplexed by the multiplexing unit, and to output the monitoring signal to the control unit.

5. The optical transmission apparatus according to claim 1, wherein
the multiplexing unit comprises:
a second wavelength selection unit configured to select an optical signal of the second wavelength from an input optical signal, and output the selected optical signal; and
a coupler configured to multiplex the optical signal output from the filter unit and the optical signal of the second wavelength output from the second wavelength selection unit, and output the multiplexed optical signal.

6. The optical transmission apparatus according to claim 1, wherein the multiplexing unit multiplexes an optical signal including an optical signal having at least the first wavelength obtained by wavelength-filtering the optical signal passing through the filter unit and an optical signal of the second wavelength selected from an input optical signal, and output the multiplexed optical signal.

7. An optical communication system comprising:
a first terminal station comprising an optical transmission apparatus;
a second terminal station; and
a third terminal station, wherein
the optical transmission apparatus comprises:
a branching unit configured to branch a wavelength-multiplexed optical signal including an optical signal of a first wavelength into a first branched light and a second branched light;
a first wavelength selection unit configured to block an optical signal of a first wavelength band including the first wavelength in the first branched light;
a filter unit configured to allow passage of an optical signal of a second wavelength band including the first wavelength in the second branched light; and
a multiplexing unit configured to receive an optical signal of a second wavelength, to multiplex an optical signal output from the filter unit and the optical signal of the second wavelength, and to output the multiplexed optical signal, wherein
the second wavelength band is wider than the first wavelength band, wherein
the second wavelength band is a wavelength band that includes the first wavelength band, a first wavelength margin provided on a short wavelength side of the first wavelength band, and a second wavelength margin provided on a long wavelength side of the first wavelength band,
the first wavelength band is a wavelength band that includes a wavelength band of an optical signal output from the first wavelength selection unit, a third wavelength margin provided on a short wavelength side of a wavelength band of an optical signal output from the first wavelength selection unit, and a fourth wavelength margin provided on a long wavelength side of the wavelength band of the optical signal output from the first wavelength selection unit,
the first wavelength margin is wider than the third wavelength margin, and
the third wavelength margin is wider than the fourth wavelength margin.

8. An optical signal transmission method comprising:
branching a wavelength-multiplexed optical signal including an optical signal of a first wavelength into a first branched light and a second branched light;

blocking a first wavelength band including the first wavelength in the first branched light;
allowing passage of a second wavelength band including the first wavelength in the second branched light; and
multiplexing an optical signal of the second wavelength band and the optical signal of the second wavelength, and outputting the multiplexed optical signal, wherein
the second wavelength band is wider than the first wavelength band, wherein
the second wavelength band is a wavelength band that includes the first wavelength band, a first wavelength margin provided on a short wavelength side of the first wavelength band, and a second wavelength margin provided on a long wavelength side of the first wavelength band,
the first wavelength band is a wavelength band that includes a wavelength band of an optical signal output from the first wavelength selection unit, a third wavelength margin provided on a short wavelength side of a wavelength band of an optical signal output from the first wavelength selection unit, and a fourth wavelength margin provided on a long wavelength side of the wavelength band of the optical signal output from the first wavelength selection unit,
the first wavelength margin is wider than the third wavelength margin, and
the third wavelength margin is wider than the fourth wavelength margin.

\* \* \* \* \*